United States Patent
McCullough et al.

(10) Patent No.: US 10,957,206 B2
(45) Date of Patent: Mar. 23, 2021

(54) SYSTEM AND METHOD FOR INTEGRATION OF SMART TRAJECTORY GENERATION AND DECISION AID APPLICATIONS IN LEGACY COCKPITS

(71) Applicant: HONEYWELL INTERNATIONAL INC., Morris Plains, NJ (US)

(72) Inventors: Susan McCullough, Phoenix, AZ (US); Mahesh Sivaratri, Bangalore (IN); Raghu Shamasundar, Bangalore (IN); Kalimulla Khan, Bangalore (IN); Srihari Jayathirtha, Bangalore (IN); Sushma Bidrupane, Bangalore (IN); Mark Pearson, Peoria, AZ (US); Todd Wisner, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 91 days.

(21) Appl. No.: 15/787,077

(22) Filed: Oct. 18, 2017

(65) Prior Publication Data
US 2019/0114927 A1 Apr. 18, 2019

(51) Int. Cl.
G05D 1/10 (2006.01)
G08G 5/00 (2006.01)
G06F 16/951 (2019.01)

(52) U.S. Cl.
CPC ......... *G08G 5/0021* (2013.01); *G06F 16/951* (2019.01); *G08G 5/0013* (2013.01);
(Continued)

(58) Field of Classification Search
CPC .......................... G08G 5/0021; G06F 16/951
See application file for complete search history.

(56) References Cited

U.S. PATENT DOCUMENTS 6,072,473 A * 6/2000 Muller ................... G01O 23/00
345/156
6,334,344 B1 1/2002 Bonhoure et al.
(Continued)

FOREIGN PATENT DOCUMENTS

EP 1947624 A1 7/2008
EP 2136276 A2 12/2009
(Continued)

OTHER PUBLICATIONS

European Patent and Trademark Office, European Extended Search Report for Application No. EP18201077.7 dated Mar. 21, 2019.
(Continued)

*Primary Examiner* — Jess Whittington
(74) *Attorney, Agent, or Firm* — Lorenz & Kopf, LLP

(57) ABSTRACT

A system for integrating flight crew decision aid applications in an aircraft cockpit includes a touch screen controller (TSC) that comprises a data mining engine configured to mine aircraft data from the already existing avionics interface and a flight plan and trajectory generating engine (FPTGE) configured to retrieve a trajectory request from a requesting flight crew decision aid application, compute one or more theoretical trajectories using the mined aircraft data, and transmit the one or more theoretical trajectories to the requesting flight crew decision aid application. The TSC also comprises a flight crew decision aid application configured to receive a flight crew request for simulated data from a touch screen user interface, generate and transmit one or more requested trajectory requests to the FPTGE, receive data from the one or more theoretical trajectories from the FPTGE, and display the requested simulated data on the touch screen user interface.

20 Claims, 7 Drawing Sheets

(52) U.S. Cl.
CPC ......... *G08G 5/0034* (2013.01); *G08G 5/0039* (2013.01); *G08G 5/0078* (2013.01); *G08G 5/0086* (2013.01); *G08G 5/0091* (2013.01); *G06F 2216/03* (2013.01)

(56) References Cited

U.S. PATENT DOCUMENTS

| | | | | |
|---|---|---|---|---|
| 8,712,605 | B1* | 4/2014 | Schulte | G01O 23/00 701/3 |
| 9,691,287 | B1* | 6/2017 | Shapiro | G08G 5/0091 |
| 2008/0027629 | A1* | 1/2008 | Peyrucain | G08G 5/0021 701/467 |
| 2008/0094255 | A1* | 4/2008 | Bethel | B64D 43/00 340/971 |
| 2012/0296496 | A1* | 11/2012 | Hedrick | G05D 1/0077 701/3 |
| 2014/0343759 | A1* | 11/2014 | Garrido-Lopez | G08G 5/0052 701/3 |
| 2015/0261379 | A1* | 9/2015 | Kneuper | G08G 5/0052 345/173 |
| 2015/0356873 | A1 | 12/2015 | Kneuper et al. | |
| 2016/0078770 | A1* | 3/2016 | Coulmeau | G06F 3/04845 701/3 |
| 2016/0155337 | A1* | 6/2016 | Krishna | G08G 5/0013 345/8 |
| 2017/0068253 | A1* | 3/2017 | Hedrick | G08G 5/003 |
| 2017/0251501 | A1* | 8/2017 | Batsakes | B64D 43/00 |
| 2017/0363925 | A1* | 12/2017 | Kostrzewski | G02F 1/136286 |

FOREIGN PATENT DOCUMENTS

| | | |
|---|---|---|
| EP | 2801965 A2 | 11/2014 |
| FR | 2787587 A1 | 6/2000 |

OTHER PUBLICATIONS

Garmin, "G3X Touch Display," Garmin Website (https://buy.garmin.com), printed on Aug. 2, 2017.
Rockwell Collins, "Pro Line Fusion," Feb. 2015, https://www.rockwellcollins.com.

* cited by examiner

SYSTEM AND METHOD FOR INTEGRATION OF SMART TRAJECTORY GENERATION AND DECISION AID APPLICATIONS IN LEGACY COCKPITS

TECHNICAL FIELD

The present invention generally relates to aircraft display systems, and more particularly relates to avionics touchscreen systems.

BACKGROUND

An aircraft cockpit may include multi-function control and display units (MCDUs) that may interface with flight deck equipment such as the flight management system (FMS) on the aircraft for the entry and display of flight data. The existing MCDUs do not have the capability to provide smart/advanced features, such as What-IF simulations that allow the flight crew to preview proposed flight path changes, due to their limited hardware and graphical display capabilities.

Providing smart/advanced features in legacy cockpits may require infrastructure upgrades such as the addition of wireless gateways such as Wi-Fi and Bluetooth, and/or cockpit wiring changes. Providing smart/advanced features in legacy cockpits may also require avionics software upgrades. When these types of upgrades are introduced, certification of hardware and software may be required with the upgrade, if the upgrade is even possible. Making upgrades may have a large impact on other cockpit systems.

Hence, it is desirable to provide systems and methods for providing advanced avionics functions in legacy and/or in-service aircrafts with minimum or no impact to the other cockpit systems. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a system for integrating flight crew decision aid applications in an aircraft cockpit is disclosed. The system includes a touch screen controller (TSC) that includes a touch screen user interface, is configured to be mounted in an aircraft cockpit in place of a multi-purpose control/display unit (MCDU), and is configured to communicate with avionics systems via an already existing avionics interface. The TSC includes a data mining engine including one or more processors configured by programming instructions encoded on non-transient computer readable media and configured to mine aircraft data from the avionics interface. The TSC further includes a flight plan and trajectory generating engine (FPTGE) including one or more processors configured by programming instructions encoded on non-transient computer readable media and configured to retrieve a trajectory request from a requesting flight crew decision aid application, compute one or more theoretical trajectories using the mined aircraft data, and transmit the one or more theoretical trajectories to the requesting flight crew decision aid application. The TSC also includes a flight crew decision aid application including one or more processors configured by programming instructions encoded on non-transient computer readable media and configured to receive a flight crew request for simulated data from the touch screen user interface, generate and transmit the one or more requested trajectory requests to the FPTGE, receive data from the one or more theoretical trajectories from the FPTGE, and display the requested simulated data on the touch screen user interface.

In another embodiment, a method for integrating flight crew decision aid applications in an aircraft cockpit is disclosed. The method includes mining aircraft data from an avionics interface using a touchscreen controller (TSC) mounted in an aircraft cockpit in place of a multi-purpose control/display unit (MCDU), receiving from a flight crew decision aid application selection options for selecting simulated data to be displayed on a touch screen user interface of the TSC, displaying the selection options on the touch screen user interface, receiving, via the touch screen user interface, a selection of the simulated data to be displayed, transmitting the selection of the simulated data to the requesting flight crew decision aid application, receiving from the flight crew decision aid application a trajectory request from which the selected simulated data may be derived, computing one or more theoretical trajectories responsive to the trajectory request using the mined aircraft data, transmitting the one or more theoretical trajectories to the requesting flight crew decision aid application, receiving, from the flight crew decision aid application, the requested simulated data, and displaying, on the touch screen user interface, the requested simulated data.

In another embodiment, an avionics touchscreen system configured to be mounted in an aircraft cockpit in place of a multi-purpose control/display unit (MCDU) and to communicate with avionics systems via an avionics interface is disclosed. The avionics touchscreen system includes a touch screen user interface and one or more processors configured by programming instructions encoded on non-transient computer readable media. The avionics touchscreen system is configured to mine aircraft data from the avionics interface, receive from a flight crew decision aid application selection options for selecting simulated data to be displayed on the touch screen user interface, display the selection options on the touch screen user interface, receive, via the touch screen user interface, a selection of the simulated data to be displayed, transmit the selection of the simulated data to the requesting flight crew decision aid application, receive from the flight crew decision aid application a trajectory request from which the selected simulated data may be derived, compute one or more theoretical trajectories responsive to the trajectory request using the mined aircraft data, transmit the one or more theoretical trajectories to the requesting flight crew decision aid application, receive, from the flight crew decision aid application, the requested simulated data, and display, on the touch screen user interface, the requested simulated data.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, touchscreens, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
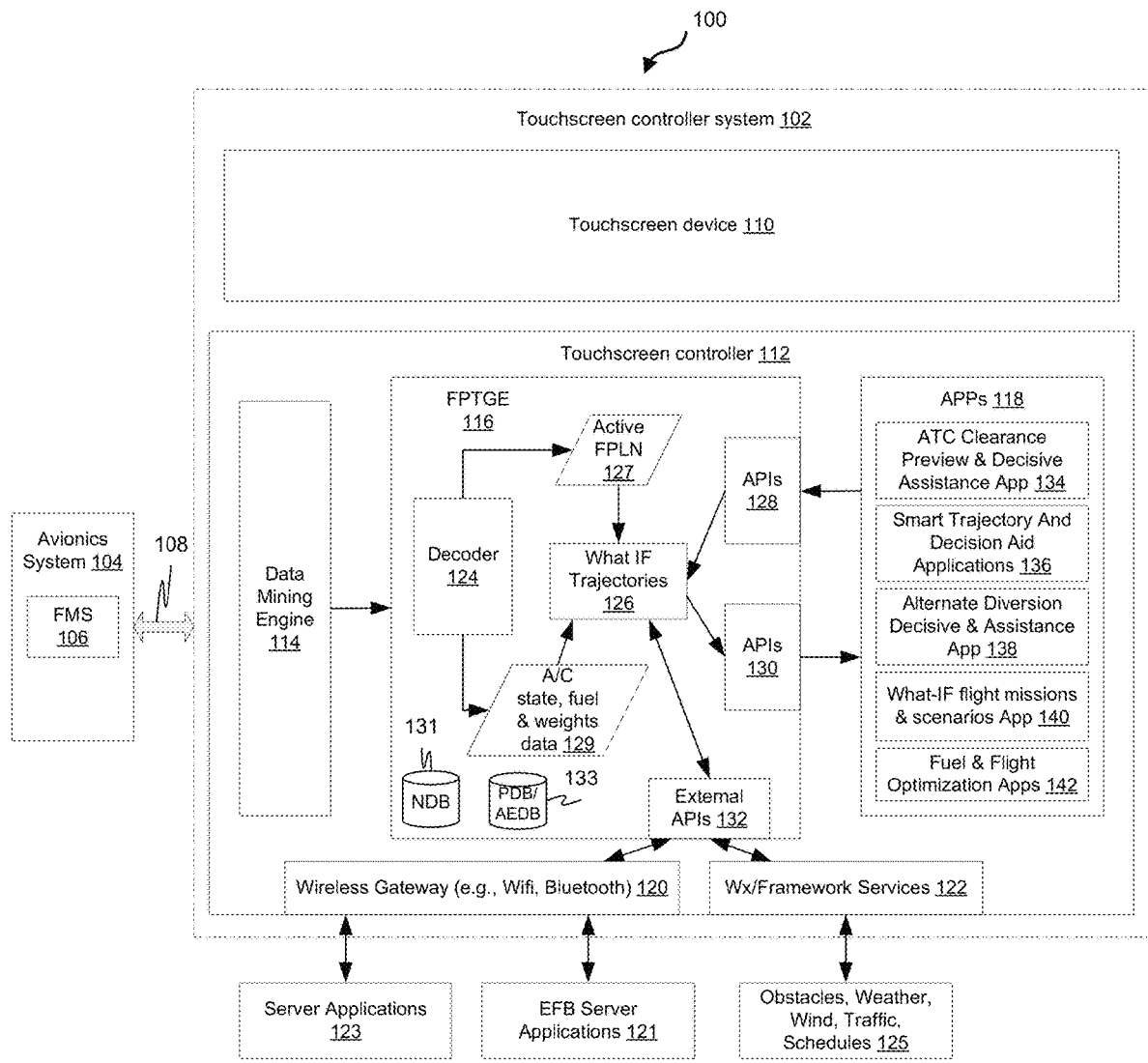
FIG. 1 is a block diagram depicting an example aircraft system that includes a touchscreen controller system configured for use in an aircraft cockpit to provide advanced features, in accordance with some embodiments.

FIG. 1 is a block diagram depicting an example aircraft system 100 providing an aircraft flight crew with flight information for use during flight. The example aircraft system 100 includes a touchscreen controller system 102 coupled to avionics systems 104 in an aircraft. The avionics systems 104 may include a variety of flight deck systems 106 such as a flight management system (FMS), a flight director (FD) system, a communication management function (CMF), a maintenance system, communication/navigation systems, radio systems, central maintenance computers (CMCs), forward display control systems, and other avionics systems utilized to open and interact with navigational charts, to list but a few examples.

The example touchscreen system 102 can provide smart/advanced features for legacy or in-service cockpits that previously did not exist. The example touchscreen system 102 can provide these features without introducing hardware infrastructure upgrades, such as adding Wi-Fi gateways or Bluetooth gateways, or implementing cockpit wiring changes which may be highly challenging to implement. Moreover, the example touchscreen system 102 can provide these features without requiring avionics software upgrades. Additionally, the example touchscreen system 102 can provide smart/advanced features without recertifying the avionics software.

The example touchscreen system 102 is configured to generate What-IF 4D (four-dimensional) trajectories. The example touchscreen system 102 is configured to decode/interpret flight plan (FPLN) data received from the avionics systems 104, implement flight plan modifications, and generate What-IF 4D Trajectories. The example touchscreen system 102 is configured to retrieve and simulate an ATC instruction request, such as a request to replace an existing approach from the flight plan with a new approach. To accomplish this task, the example touchscreen system 102 is configured to retrieve all the legs associated with the existing approach and is configured to insert new approach legs and meld the approach procedure accordingly. The example touchscreen system 102 is further configured to, e.g., when an ATC instruction is to fly a HOLD, compute the fuel required to fly the HOLD and verify whether the remaining fuel onboard is sufficient to fly the HOLD.

Figure 2A:
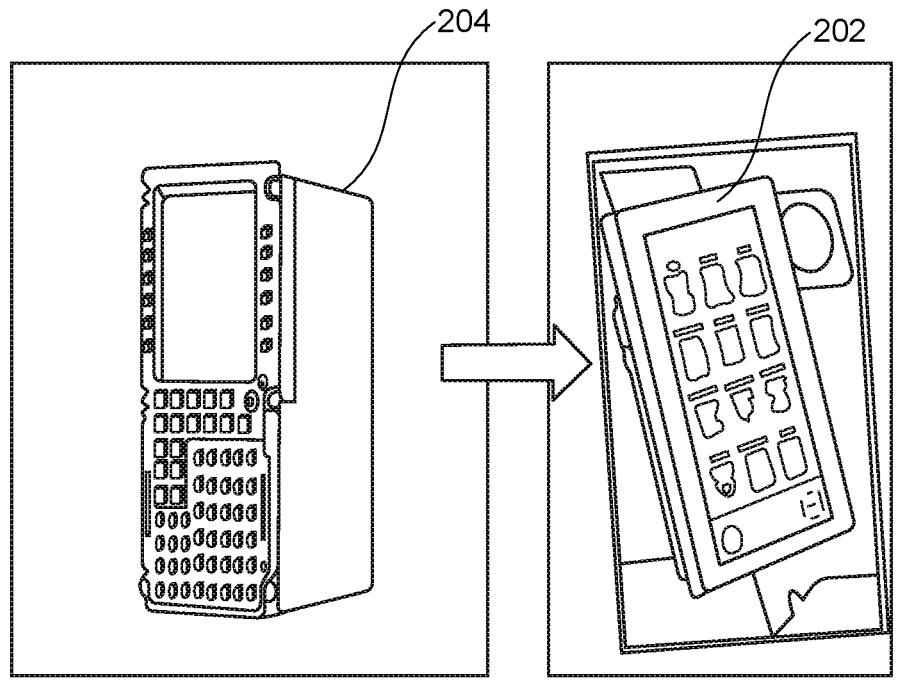
FIGS. 2A and 2B are diagrams depicting an example touchscreen system configured mechanically and electrically to be mounted in a cockpit in the place of an MCDU, in accordance with some embodiments.
Figure 2B:
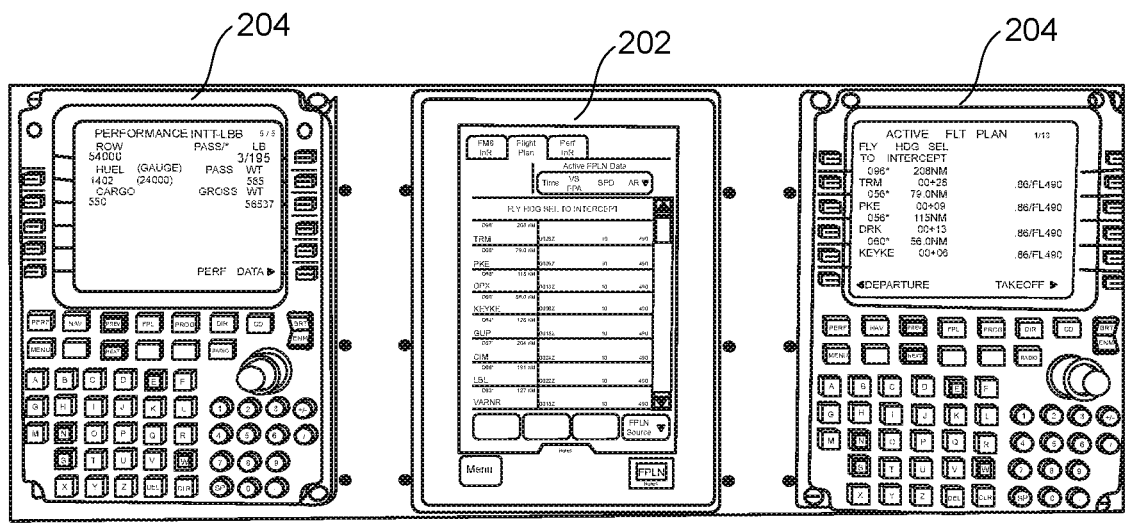

The example touchscreen system 102 is configured to be mounted in an aircraft cockpit in place of a multi-purpose control/display unit (MCDU). FIGS. 2A and 2B are diagrams depicting an example touchscreen system 202 configured mechanically and electrically to be mounted in a cockpit in the place of an MCDU 204. The example touchscreen system 202 is configured with a mechanical footprint that allows it to be mounted in the area vacated by an MCDU 204, as illustrated in FIG. 2B. The example touchscreen system 204 is configured with an avionics interface that allows the example touchscreen system 204 to communicate with avionics systems via an already existing MCDU interface.

Referring back to FIG. 1, the example touchscreen system 102 is configured with an avionics interface to communicate with the avionics systems 106 via an already existing aircraft data transfer system 108. Examples of standard aircraft data transfer systems include an ARINC 429 digital information transfer system with an ARINC 739 MCDU communication protocol or RS232 transfer system with similar MCDU communication protocol. In other examples, the touchscreen system 102 may be configured to communicate with the avionics systems 106 via other aircraft data transfer systems such as a proprietary aircraft data transfer system or some other standard or non-standard aircraft data transfer system. The avionics interface in the example touchscreen system 102 includes a standard avionics interface such as a standard MCDU interface existing in legacy cockpits. The avionics interface may be compliant with an ARINC 429 system or RS232 system. In some examples, the avionics interface may be compliant with a proprietary aircraft data transfer system, or some other standard or non-standard aircraft data transfer system.

The example touchscreen system 102 includes a touchscreen device 110 and a touchscreen controller (TSC) 112. The example touchscreen device 110 includes a touchscreen surface layered over a visual display. The touchscreen surface is configured to receive user input through single-touch or multi-touch gestures. The visual display is configured to display a graphical user interface (GUI) generated by the controller 112 during the execution of an application program. The GUI may provide one or more widgets for display that may allow for displaying, entering and/or editing data.

The example TSC 112 includes at least one processor and a computer-readable storage device or media. The processor may be any custom-made or commercially available processor, a central processing unit (CPU), a graphics processing unit (GPU), an application specific integrated circuit (ASIC), a field programmable gate array (FPGA), an auxiliary processor among several processors associated with the TSC 112, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 112.

The processors and memory of the example TSC 112 are configured by the executable programming instructions to provide a data mining engine 114, a flight plan and trajectory generating engine (FPTGE) 116, and one or more applications programs (APPs) 118. The example application programs 118 when executing may cause the generation of display screens containing widgets and other graphical elements on the display of the touchscreen device 110.

The example TSC 112 also includes a wireless gateway 120 for providing access to electronic flight bag (EFB) server applications 121 that may assist flight crews perform flight management tasks more efficiently. The example wireless gateway 120 may also provide the flight crew with access to various network or file servers 123. The example wireless gateway 120 may include Wi-Fi systems, Bluetooth system, and/or other wireless systems.

The example TSC 112 also includes a Weather/Framework service interface 122 configured to retrieve flight condition data for use during flight or mission planning from a weather/framework service provider 125. The flight condition data may include information regarding obstacles, weather, wind, air traffic, schedules, and others that the flight crew may encounter or need to know about during flight. The Weather/Framework service interface 122 is configured to retrieve real time atmospheric conditions, obstacles, and traffic data from external systems through the wireless interface.

The example data mining engine 114 is configured to mine aircraft data from the existing avionics interface. The aircraft data may include, but not limited to, one or more of flight plan data, fuel and weights data, ATC log data, aircraft state data, and aircraft sensors data.

The example FPTGE 116 is configured to retrieve a trajectory request from a requesting flight crew decision aid application 118, compute one or more theoretical trajectories using the mined aircraft data, and transmit the one or more theoretical trajectories to the requesting flight crew decision aid application 118. The FPTGE is further configured to compute the one or more theoretical trajectories using one or more of the retrieved real time atmospheric conditions, obstacles, and traffic data. Additionally, the FPTGE is configured to compute the one or more theoretical trajectories using one or more of data retrieved from EFB server applications 121 and/or other external network or file servers 123.

The example FPTGE 116 includes a decoder 124 configured to decode the mined aircraft data retrieved by the data mining engine 114. The decoded data may include, but not limited to, active flight plan (FPLN) data 127 and aircraft (A/C) state, fuel and weights data 129, air traffic control (ATC) log data, and aircraft sensor data.

The example FPTGE 116 includes a What-If trajectory module 126 configured to calculate theoretical trajectories. The example What-If trajectory module 126 is configured to receive a trajectory request from a requesting flight crew decision aid application 118 via an APIs interface 128, use the active FPLN data 127 and aircraft (A/C) state and fuel data 129 to compute one or more theoretical trajectories and provide the one or more theoretical trajectories to the requesting flight crew decision aid application 118 via an APIs interface 130. The example What-If trajectory module 126 is further configured to retrieve other external data such as obstacles, weather, wind, traffic, schedules, EFB data, and other data from external sources via an external APIs interface 132 interfaced to the wireless gateway 120 and/or the Weather/Framework service interface 122. The example FPTGE 116 further includes a navigational database (NDB) 133 and other aircraft specific databases, such as an aircraft engine database (AEDB) and performance database (PDB) for use by the FPTGE 116 in computing the one or more theoretical trajectories.

The example Apps 118 include one or more flight crew decision aid applications configured to present options to a flight crew for the display of simulated data via the touchscreen display, receive a flight crew request for simulated data from the touch screen user interface, generate and transmit the one or more requested trajectory requests to the FPTGE, receive one or more theoretical trajectories from the FPTGE, and display data from the one or more theoretical trajectories on the touch screen display. One or more of the flight crew decision aid application may be further configured to present a selection option and receive a selection via the touch screen user interface of at least a portion of the simulated data to submit to one or more of the avionics systems 104 via the existing avionics interface. The flight crew decision aids 118 may include, but not limited to, one or more of an ATC Clearance Preview and Decisive Assistance App 134, a Smart Trajectory and Decision Aid Application 136, an alternate diversion decisive and assistance App 138, a What-IF Flight Missions and Scenarios App 140, and a fuel and flight optimization app 142.

Figure 3:
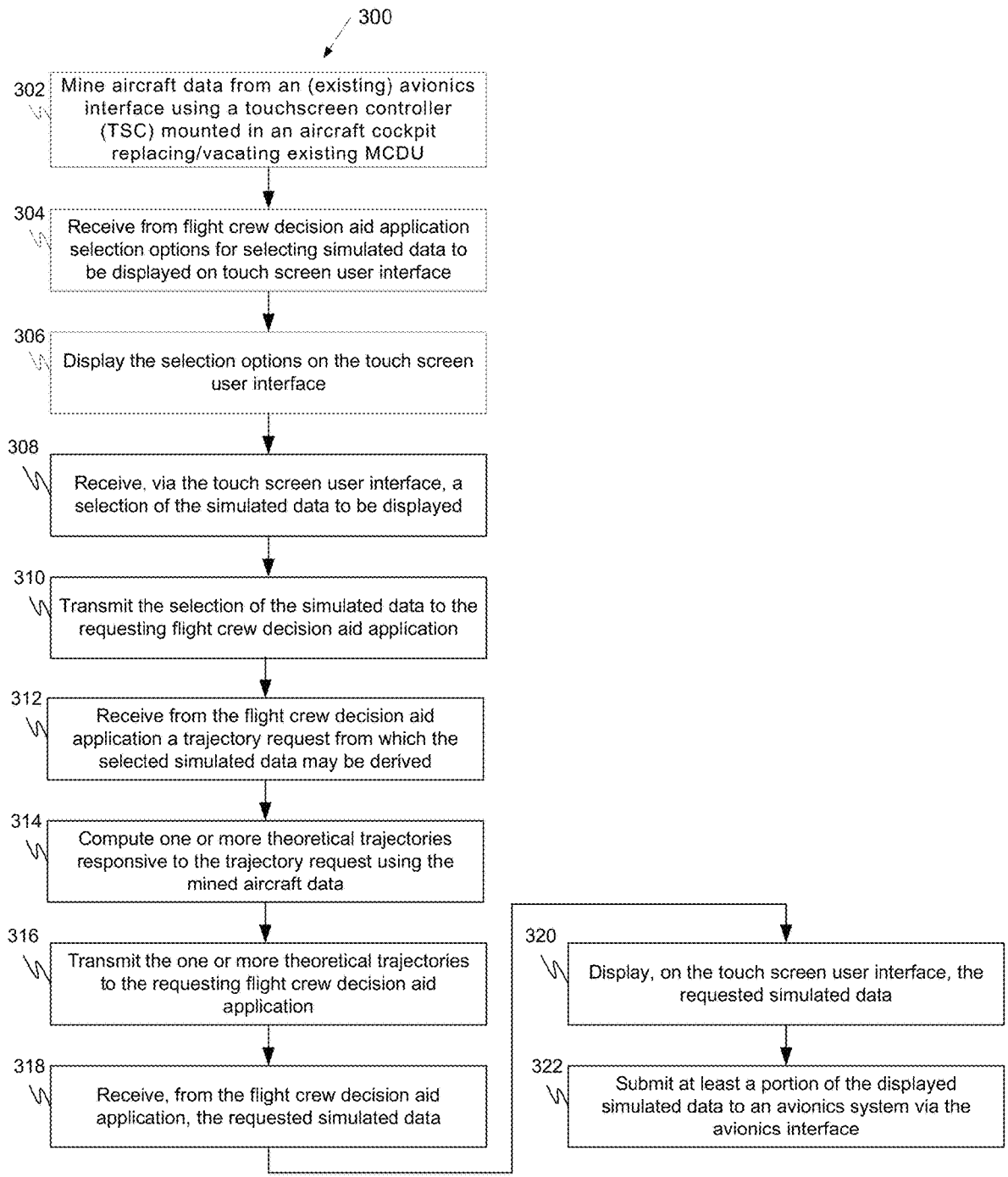
FIG. 3 is a process flow chart depicting an example process in an example touchscreen system configured for use in an aircraft cockpit in place of legacy cockpit display systems, in accordance with some embodiments.

FIG. 3 is a process flow chart depicting an example process 300 in an example touchscreen system configured for use in an aircraft cockpit in place of legacy MCDU cockpit display systems. The order of operation within the process is not limited to the sequential execution as illustrated in the figure, but may be performed in one or more varying orders as applicable and in accordance with the present disclosure. In various embodiments, the process can be scheduled to run based on one or more predetermined events, and/or can run continuously during operation of the aircraft.

The example process 300 includes mining aircraft data from an avionics interface using a touchscreen controller (TSC) mounted in an aircraft cockpit (operation 302). The TSC may be configured to be mounted in an aircraft cockpit in place of a multi-purpose control/display unit (MCDU). The avionics interface may include an avionics interface such as a standard MCDU interface existing in a legacy or in-service cockpit. The avionics interface may include an ARINC 429 compliant interface, an ARINC 739 compliant interface, an RS232 interface, and/or an interface for a proprietary aircraft data transfer system.

Mining aircraft data may include retrieving aircraft data from a standard or non-standard aircraft interface such as an ARINC 429 interface, an ARINC 739 interface, an RS232 interface, a proprietary aircraft data transfer system interface or some other standard or non-standard aircraft data transfer system interface. Retrieving aircraft data may include retrieving aircraft data from avionics systems such as an FMS or a communication management function (CMF). The aircraft data may include, but not limited to, one or more of flight plan data, fuel and weights data, ATC log data, aircraft state data, and aircraft sensors data.

The example process 300 further includes receiving, from a flight crew decision aid application, selection options for selecting simulated data to be displayed on a touch screen user interface of the TSC (operation 304) and displaying the selection options on the touch screen user interface (operation 306). Next, the example process 300 includes receiving, via the touch screen user interface, a selection of the simulated data to be displayed (operation 308) and transmitting the selection of the simulated data to the requesting flight crew decision aid application (operation 310).

The example process 300 further includes receiving from the flight crew decision aid application a trajectory request from which the selected simulated data may be derived (operation 312) and computing one or more theoretical trajectories responsive to the trajectory request using the mined aircraft data (operation 314). Computing one or more theoretical trajectories may include using mined active flight plan data, aircraft state data, and/or aircraft fuel data from avionics systems. In some examples, computing one or more theoretical trajectories may also include computing one or more theoretical trajectories using one or more of real time atmospheric conditions, obstacles, and traffic data retrieved through a wireless interface. In some examples, computing one or more theoretical trajectories may also include computing one or more theoretical trajectories using data from a navigational database (NDB) and/or other aircraft specific databases such as an aircraft engine database (AEDB) and a performance database (PDB). In some examples, computing one or more theoretical trajectories may also include computing one or more theoretical trajectories using data from an external server and/or an EFB server.

The example process 300 further includes transmitting the one or more theoretical trajectories to the requesting flight crew decision aid application (operation 316), receiving, from the flight crew decision aid application, the requested simulated data (operation 318), and displaying, on the touch screen user interface, the requested simulated data (operation 320). The example process 300 may further include submitting at least a portion of the displayed simulated data to an avionics system via the avionics interface (operation 322).

Figure 4B:
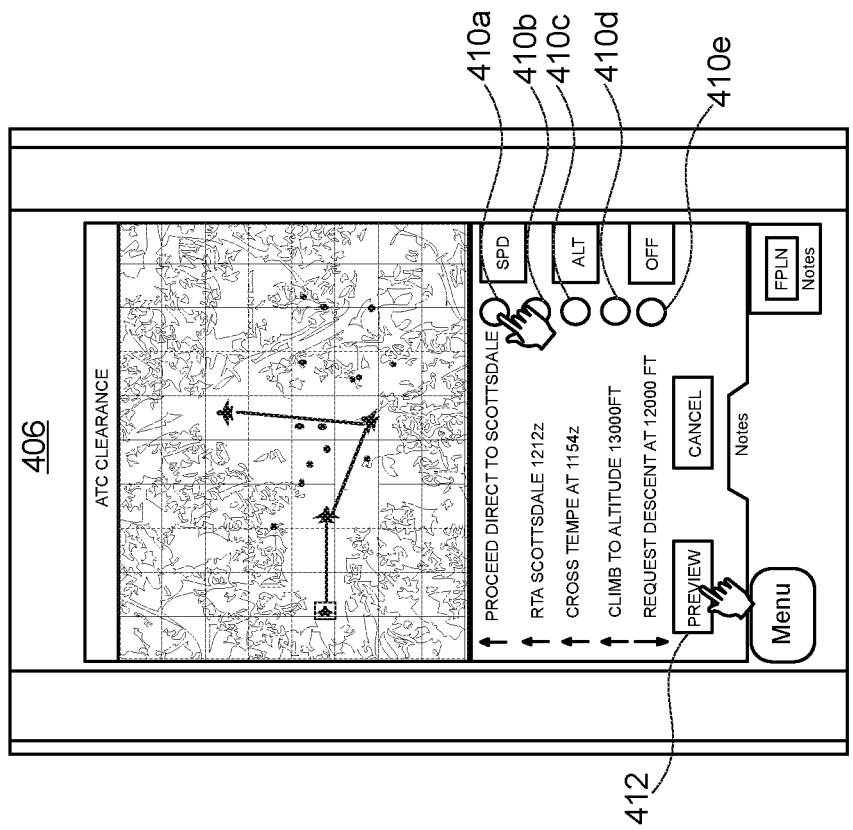
FIGS. 4A-4H depict example screenshots from an example touchscreen controller system configured for use in an aircraft cockpit in place of a legacy cockpit display system, in accordance with some embodiments.
Figure 4A:
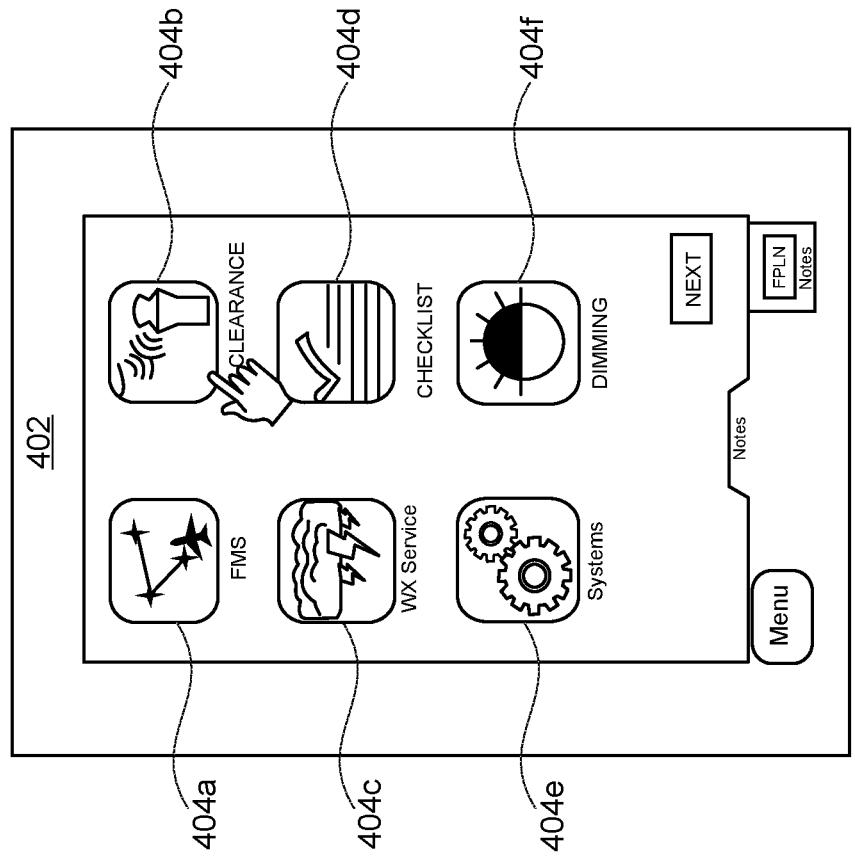

FIGS. 4A-4H depict example screenshots from an example touchscreen controller system configured for use in an aircraft cockpit in place of a legacy cockpit display system. FIG. 4A depicts an example menu view 402 of a graphical user interface that allows for the selection of a flight crew decision aid application. In this example, widgets (404a-404f) for six different flight crew decision aid apps are provided for selecting a flight crew decision aid application. The widget 404b for an ATC clearance visualization app is selected via a touch gesture on the touchscreen surface, in this example.

The selection of the ATC clearance visualization app, in the example of FIG. 4A, may result in the display of an ATC clearance display screen 406, as shown in FIG. 4B. The example ATC clearance display screen 406 provides a visualization 408 of the current flight path and five selection buttons (410a-410e) for displaying simulated ATC clearance instructions. The example ATC clearance display screen 406 also includes a preview button 412 for use in requesting that the ATC clearance visualization app display of preview of a selected ATC clearance instruction. In this example, the "PROCEED DIRECT TO SCOTTSDALE" ATC clearance instruction is selected via a touch gesture with the selection button 410a, and it is requested that the ATC clearance visualization app display a preview of this selected ATC clearance instruction via a touch gesture with the preview button 412.

Figure 4D:
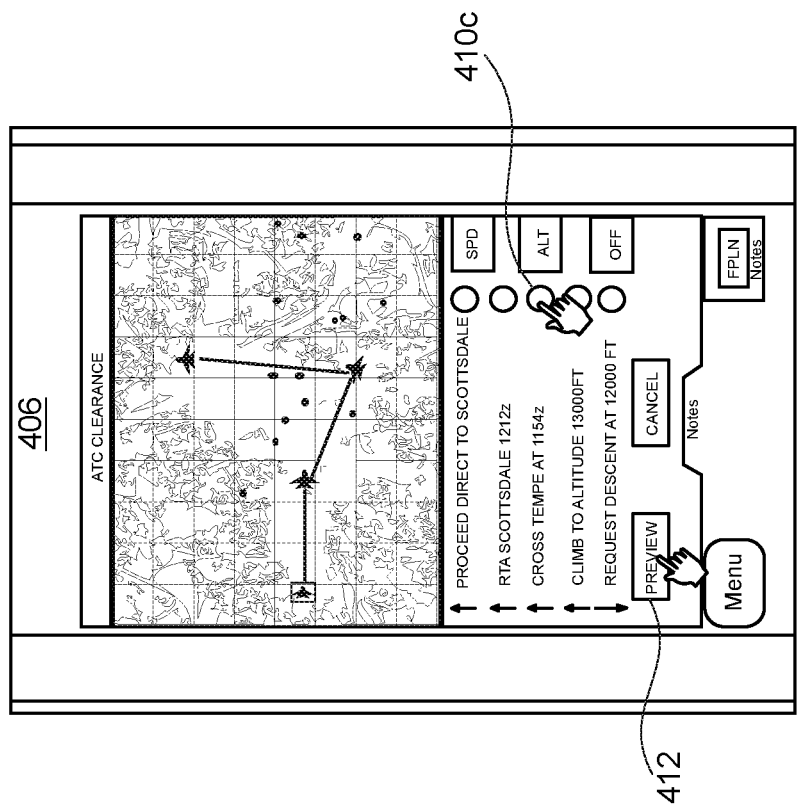
Figure 4C:
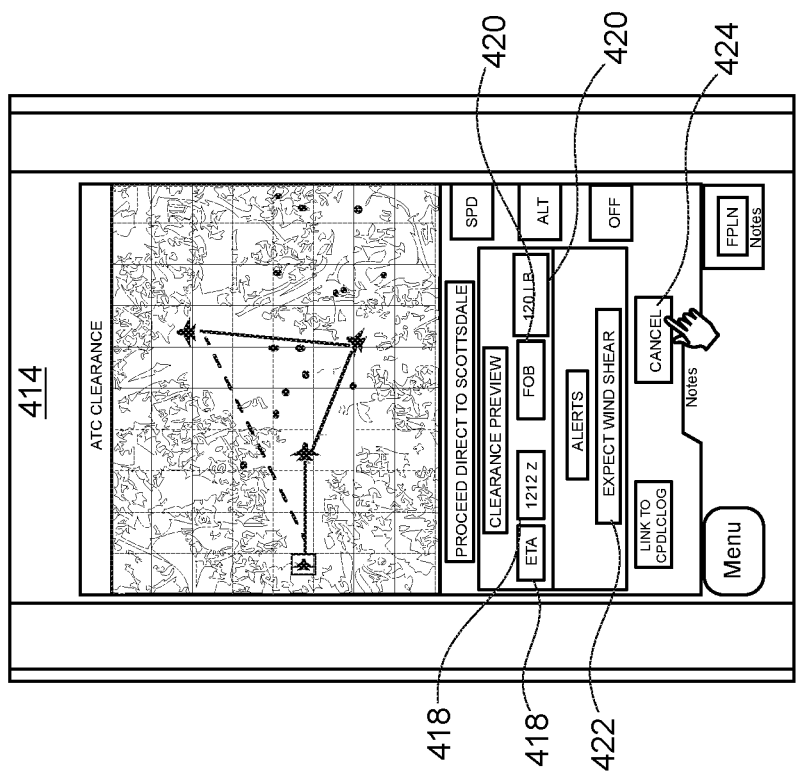

The selection of the "PROCEED DIRECT TO SCOTTSDALE" ATC clearance instruction, in the example FIG. 4B, may result in a visualization 416 of the selected clearance instruction in a PROCEED DIRECT TO SCOTTSDALE ATC clearance screen 414, as shown in FIG. 4C. On selecting the preview button 412 for a particular ATC Instruction, the touchscreen controller system via a FPTGE revises/modifies the active flight plan retrieved through data mining with the flight path change(s) specified in the ATC clearance instruction without affecting the active or pending flight plan of the onboard FMS. As a result, the FPTGE generates a What-IF trajectory for the ATC clearance instruction and a graphical representation 416 of the change (preview) is displayed to the flight crew by the ATC clearance visualization app along with additional information related to clearance instruction. In this example, the ATC clearance visualization app displays, with the clearance preview 416, the estimated time of arrival (ETA) 418 and the projected fuel on board (FOB) 420 if the clearance instruction is executed. In other examples, the additional information related to the clearance instruction's impact to flight trajectory may include the impact with respect to fuel consumption, speed, time, and others. Additionally, the example ATC clearance visualization app displays potential alerts associated with the clearance instruction that the flight crew should be aware of such as the "expect wind shear" alert 422 shown in this example. In some examples, the ATC clearance visualization app may also provide recommendations for flight plan changes regarding which the flight crew can negotiate with the ATC. A cancel button 424 is also provided that when selected cancels the display of the PROCEED DIRECT TO SCOTTSDALE ATC clearance screen 414 and returns to the previous display screen. If the flight crew is fine with the preview and the potential impact of the ATC clearance instructions to the flight path, the flight crew can accept the ATC clearance message or can negotiate with the ATC for different flight path changes.

The selection of the cancel button 424, in the example of FIG. 4C, may result in the display of an ATC clearance display screen 406, as shown in FIG. 4D. In this example, the "CROSS TEMPE AT 1154z" ATC clearance instruction is selected via a touch gesture with the selection button 410c. The ATC clearance visualization app is requested to display a preview of this selected ATC clearance instruction via a touch gesture with the preview button 412.

Figure 4F:
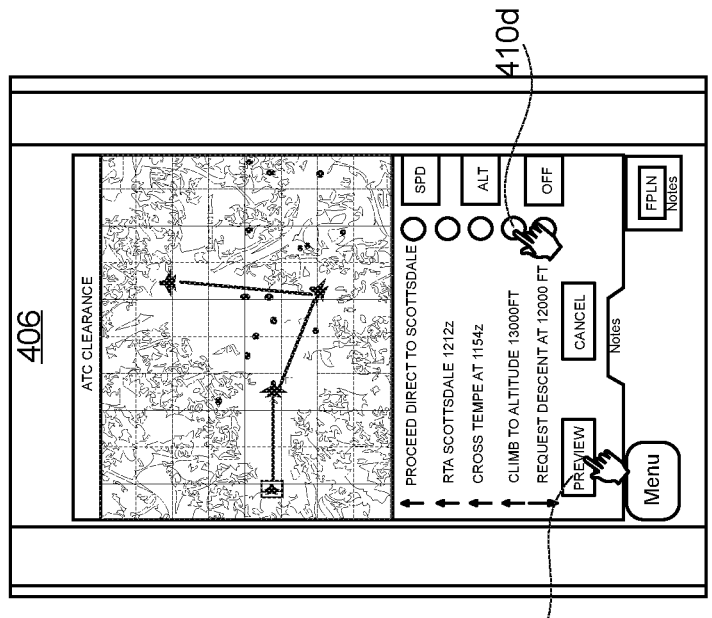
Figure 4E:
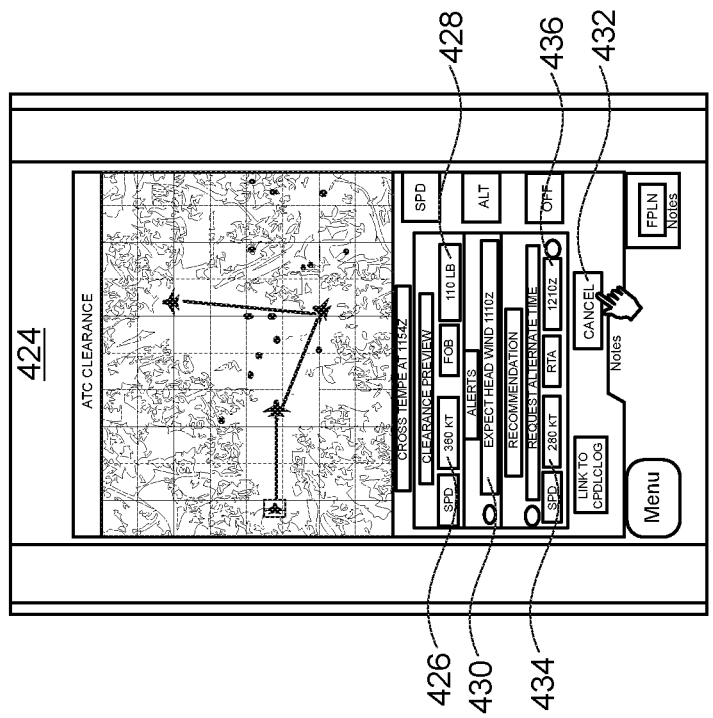

The selection of the "CROSS TEMPE AT 1154z" ATC clearance instruction (via selection button 410c) coupled with the selection of the preview button 412, in the example FIG. 4D, may result in a visualization of the selected clearance instruction in a CROSS TEMPE AT 1154z ATC clearance screen 424, as shown in FIG. 4E. Responsive to the selection of the preview button 412, the FPTGE revises/modifies the active flight plan retrieved through data mining with the flight path change(s) as specified in the ATC clearance instruction without affecting the active or pending flight plan of the onboard FMS. The FPTGE generates a What-IF trajectory for the ATC clearance instruction and a graphical representation of the change (preview) is displayed to the flight crew by the ATC clearance visualization app along with additional information related to clearance instruction.

In this example, the ATC clearance visualization app displays the impact of the instruction on the speed profile, and in particular displays the speed (SPD) 426 and the projected fuel on board (FOB) 428 to meet the time constraint if the ATC instruction is executed. In this example, the flight crew is alerted that the required speed (360 kt) to meet the time constraints is above the normal safety speed per the aircraft. Additionally, the example ATC clearance visualization app displays potential alerts associated with the clearance instruction that the flight crew should be aware of such as the "expect wind shear" alert 430 shown in this example. Also, in this example, the ATC clearance visualization app provides recommendations regarding speed 434 and requested time of arrival (RTA) 436, which can be negotiated with the ATC. A cancel button 432 is also provided that when selected cancels the display of the PROCEED DIRECT TO SCOTTSDALE ATC clearance screen 424 and returns to the prior display screen.

The selection of the cancel button 432, in the example of FIG. 4E, may result in the display of an ATC clearance display screen 406, as shown in FIG. 4F. In this example, the "CLIMB TO ALTITUDE 13000 FT" ATC clearance instruction is selected via a touch gesture with the selection button 410d, and it is requested that the ATC clearance visualization app display a preview of this selected ATC clearance instruction via a touch gesture with the preview button 412.

Figure 4H:
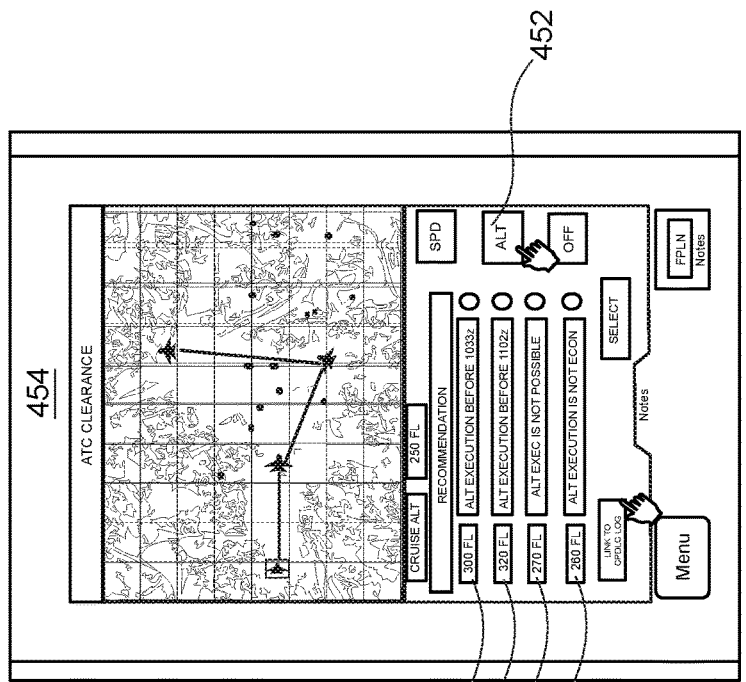
Figure 4G:
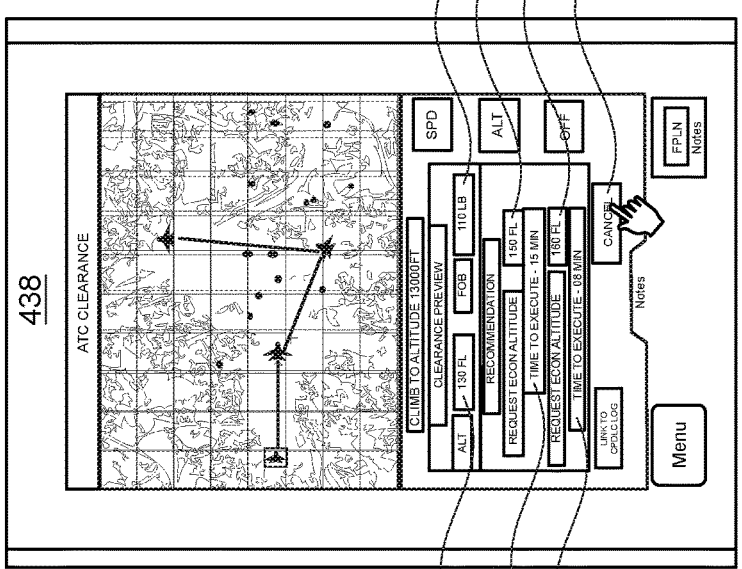

The selection of the "CLIMB TO ALTITUDE 13000 FT" ATC clearance instruction, in the example FIG. 4F, may result in a visualization of the selected clearance instruction in a CLIMB TO ALTITUDE 13000 FT clearance screen 438, as shown in FIG. 4G. In this example, the ATC clearance visualization app displays, with the clearance preview, the estimated altitude (ALT) 440 and the projected fuel on board (FOB) 442 if the clearance instruction is executed. Additionally, the example ATC clearance visualization app displays RECOMMENDATIONS regarding which the flight crew can negotiate with ATC. In this example, the RECOMMENDATIONS include two options: Request higher altitudes (150FL) 444 with an associated time duration 448 and request for higher altitude (160FL) 446 with an associated time duration 450.

The selection of the cancel button 451, in the example of FIG. 4G, coupled with the selection of the ALT (altitude) button 452 may result in the display of an ATC clearance display screen 454, as shown in FIG. 4H, along with the display of Higher Altitude Recommendations for fuel efficiency 456a-d. In this case, the touchscreen controller system, by utilizing the traffic, weather and other information that is available through external services/interfaces, provides the flight crew with various altitude options with an associated time bound.

Described herein are techniques for providing legacy or in-service aircraft with smart/advanced features. The techniques described herein, in some examples, include providing a "Flight Planning and Trajectory Generator Engine (FPTGE)" that is hosted on a touchscreen controller system that can be mounted in an aircraft cockpit in place of a MCDU. The FPTGE, in some examples, is configured to retrieve and decode the FPLN, fuel and performance data (e.g., fuel remaining, weights, etc.), aircraft state data (e.g., speed, altitude, etc.), aircraft sensor data (e.g., environmental operating conditions), and ATC clearance instructions received from a data mining engine via a standard MCDU connector. The touchscreen controller system via the FPTGE may be configured to enable the use of a variety of "Smart/Advanced Flight Path Trajectory Generation and Decision Aid Applications" to provide advanced features in the cockpit without modifications to existing flight management software as well as without requiring cockpit wiring changes and without the need for a wireless gateway to read FMS data.

In one embodiment, a system for integrating flight crew decision aid applications in an aircraft cockpit is disclosed. The system comprises a touch screen controller (TSC) that includes a touch screen user interface, is configured to be mounted in an aircraft cockpit, and is configured to communicate with avionics systems via an avionics interface. The TSC comprises a data mining engine comprising one or more processors configured by programming instructions encoded on non-transient computer readable media and configured to mine aircraft data from the avionics interface. The TSC further comprises a flight plan and trajectory generating engine (FPTGE) comprising one or more processors configured by programming instructions encoded on non-transient computer readable media and configured to retrieve a trajectory request from a requesting flight crew decision aid application, compute one or more theoretical trajectories using the mined aircraft data, and transmit the one or more theoretical trajectories to the requesting flight crew decision aid application. The TSC also comprises a flight crew decision aid application comprising one or more processors configured by programming instructions encoded on non-transient computer readable media and configured to receive a flight crew request for simulated data from the touch screen user interface, generate and transmit the one or more requested trajectory requests to the FPTGE, receive data from the one or more theoretical trajectories from the FPTGE, and display the requested simulated data on the touch screen user interface.

These aspects and other embodiments may include one or more of the following features. The touch screen controller (TSC) may be configured to be mounted in an aircraft cockpit in place of a multi-purpose control/display unit (MCDU). The avionics interface may comprise a standard avionics interface. The avionics interface may comprise a standard or non-standard MCDU interface already existing in the cockpit. The avionics interface may comprise an ARINC 429 compliant system, an ARINC 739 compliant system, an RS232 system, or a proprietary aircraft data transfer system. The avionics systems with which the touch screen controller (TSC) is configured to communicate may include an aircraft flight management system (FMS) or a communication management function (CMF). The aircraft data may comprise one or more of flight plan data, fuel and weights data, ATC log data, aircraft state data, and aircraft sensors data. The TSC may include a wireless gateway interface and the FPTGE may be further configured to retrieve real time atmospheric conditions, obstacles, and traffic data from external systems through the wireless interface. The FPTGE may be further configured to compute the one or more theoretical trajectories using one or more of the retrieved real time atmospheric conditions, obstacles, and traffic data. The FPTGE may be further configured to compute the one or more theoretical trajectories using data from a Navigation Database (NDB) and aircraft specific databases such as an Aircraft Engine Database (AEDB) and a Performance Database (PDB). The flight crew decision aid application may be further configured to present a selection option and receive a selection via the touch screen user interface of at least a portion of the simulated data to submit to the avionics systems via the avionics interface.

In another embodiment, a method for integrating flight crew decision aid applications in an aircraft cockpit is disclosed. The method comprises mining aircraft data from an avionics interface using a touchscreen controller (TSC) mounted in an aircraft cockpit, receiving from a flight crew decision aid application selection options for selecting simulated data to be displayed on a touch screen user interface of the TSC, displaying the selection options on the touch screen user interface, receiving, via the touch screen user interface, a selection of the simulated data to be displayed, transmitting the selection of the simulated data to the requesting flight crew decision aid application, receiving from the flight crew decision aid application a trajectory request from which the selected simulated data may be derived, computing one or more theoretical trajectories responsive to the trajectory request using the mined aircraft data, transmitting the one or more theoretical trajectories to the requesting flight crew decision aid application, receiving, from the flight crew decision aid application, the requested simulated data, and displaying, on the touch screen user interface, the requested simulated data.

These aspects and other embodiments may include one or more of the following features. The TSC may be configured to be mounted in an aircraft cockpit in place of a multi-purpose control/display unit (MCDU). The avionics interface may comprise a standard avionics interface. The avionics interface may comprise a standard or non-standard MCDU interface already existing in the cockpit. The avionics interface may comprise an ARINC 429 compliant system, an ARINC 739 compliant system, an RS232 system, or a proprietary aircraft data transfer system. Mining aircraft data from an avionics interface may comprise mining aircraft data from an aircraft flight management system (FMS) or a communication management function (CMF). The aircraft data may comprise one or more of flight plan data, fuel and weights data, ATC log data, aircraft state data, and aircraft sensors data. Computing one or more theoretical trajectories may comprise computing one or more theoretical trajectories using one or more of real time atmospheric conditions, obstacles, and traffic data retrieved through a wireless interface and computing one or more theoretical trajectories using data from a Navigation Database (NDB) and aircraft specific databases such as an Aircraft Engine Database (AEDB) and a Performance Database (PDB). The method may further comprise submitting at least a portion of the displayed simulated data to an avionics system via the avionics interface.

In another embodiment, an avionics touchscreen system configured to be mounted in an aircraft cockpit and to communicate with avionics systems via an avionics interface is disclosed. The avionics touchscreen system comprises a touch screen user interface and one or more processors configured by programming instructions encoded on non-transient computer readable media. The avionics touchscreen system is configured to mine aircraft data from the avionics interface, receive from a flight crew decision aid application selection options for selecting simulated data to be displayed on the touch screen user interface, display the selection options on the touch screen user interface, receive, via the touch screen user interface, a selection of the simulated data to be displayed, transmit the selection of the simulated data to the requesting flight crew decision aid application, receive from the flight crew decision aid application a trajectory request from which the selected simulated data may be derived, compute one or more theoretical trajectories responsive to the trajectory request using the mined aircraft data, transmit the one or more theoretical trajectories to the requesting flight crew decision aid application, receive, from the flight crew decision aid application, the requested simulated data, and display, on the touch screen user interface, the requested simulated data.

These aspects and other embodiments may include one or more of the following features. The TSC may be configured to be mounted in an aircraft cockpit in place of a multi-purpose control/display unit (MCDU). The avionics interface may comprise a standard avionics interface. The avionics interface may comprise a standard MCDU interface already existing in the cockpit. The avionics interface may comprise an ARINC 429 compliant system, an ARINC 661 compliant system, a wireless data transfer system, or a proprietary aircraft data transfer system. Mining aircraft data from an avionics interface may comprise mining aircraft data from an aircraft flight management system (FMS) or a communication management function (CMF). The aircraft data may comprise one or more of flight plan data, fuel and weights data, ATC log data, aircraft state data, and aircraft sensors data. Computing one or more theoretical trajectories may comprise computing one or more theoretical trajectories using one or more of real time atmospheric conditions, obstacles, and traffic data retrieved through a wireless interface. The avionics touchscreen system may be further configured to submit at least a portion of the displayed simulated data to an avionics system via the avionics interface.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A touchscreen controller (TSC) system for integrating flight crew decision aid applications in an aircraft cockpit on an aircraft, the TSC system comprising:
    a frame having a front face and a mechanical footprint that allows the TSC system to be mounted as a direct replacement for a Multi-Function Control and Display Unit (MCDU) in an area previously occupied and vacated by the MCDU in the aircraft cockpit;
    a touch screen user interface configured within the front face;
    an avionics interface comprising an MCDU interface that is configured to communicate with avionics systems on the aircraft;
    one or more processors residing within the frame and configured by programming instructions encoded on non-transitory computer readable media to:
        mine aircraft data from the avionics interface while the aircraft is executing a currently active flight plan while in flight during a mission, the mined aircraft data including active flight plan data from the currently active flight plan and aircraft state data;
        provide a graphical user interface (GUI) display on the touch screen user interface that includes a menu view with a plurality of widgets, wherein each widget represents and allows for selection of a different flight crew decision aid application from a plurality of flight crew decision aid applications,
        wherein responsive to selection of a widget representing an ATC clearance visualization app, cause a display of an ATC clearance display screen that provides a visualization of a current flight path, a plurality of selection buttons for displaying a plurality of simulated ATC clearance instructions, and a preview button selectable via a touch gesture for use in requesting that the ATC clearance visualization app display a preview of a selected ATC clearance instruction from the plurality of simulated ATC clearance instructions,
        wherein responsive to selection of the preview button for a particular ATC clearance instruction, revise the active flight plan retrieved through data mining with flight path changes specified in the ATC clearance instruction without affecting the active flight plan of an onboard flight management system (FMS), generate a What-IF trajectory for the ATC clearance instruction and a graphical representation of the changes, and cause the graphical representation of the changes to be displayed as the preview of the selected ATC clearance instruction along with additional information related to the ATC clearance instruction.

2. The system of claim 1, wherein the avionics interface complies with an industry standard avionics interface.

3. The system of claim 1, wherein the avionics interface comprises an ARINC 429 compliant system, an ARINC 739 compliant system, an RS232 system, or a proprietary aircraft data transfer system.

4. The system of claim 1, wherein the avionics systems with which the TSC system is configured to communicate include an aircraft flight management system (FMS) and a communication management function (CMF).

5. The system of claim 1, wherein the aircraft data comprises one or more of fuel and weights data, ATC log data, and aircraft sensors data.

6. The system of claim 1, wherein the TSC system includes a wireless gateway interface and wherein the TSC system is further configured to retrieve real time atmospheric conditions, obstacles, and traffic data from external systems through the wireless interface.

7. The system of claim 6, wherein the TSC system is further configured to generate the What-IF trajectory for the ATC clearance using one or more of the retrieved real time atmospheric conditions, obstacles, and traffic data; and
the TSC system is further configured to generate the What-IF trajectory for the ATC clearance using data from a Navigation Database (NDB) and aircraft specific databases such as an Aircraft Engine Database (AEDB) and a Performance Database (PDB).

8. The system of claim 1, wherein the additional information related to the ATC clearance instruction comprises an estimated time of arrival (ETA) and a projected fuel on board (FOB) if the clearance instruction is executed.

9. The system of claim 1, wherein the additional information related to the ATC clearance instruction comprises information regarding an impact with respect to fuel consumption, speed, and time.

10. The system of claim 1, wherein the additional information related to the ATC clearance instruction comprises a display of a potential alert associated with the clearance instruction.

11. The system of claim 1, wherein the additional information related to the ATC clearance instruction comprises a recommendation for flight plan changes regarding which the flight crew can negotiate with the ATC.

12. A method for integrating flight crew decision aid applications in an aircraft cockpit, the method comprising:
mining aircraft data from an avionics interface using a touchscreen controller (TSC) system, the TSC system comprising a frame having a front face and a mechanical footprint that allows the TSC system to be mounted as a direct replacement for a Multi-Function Control and Display Unit (MCDU) in an area previously occupied and vacated by the MCDU in the aircraft cockpit, the TSC further comprising a touch screen user interface configured within the front face, the mining aircraft data occurring while the aircraft is executing a currently active flight plan during a mission, the mined aircraft data including active flight plan data from the currently active flight plan and aircraft state data;
providing a graphical user interface (GUI) display on the touch screen user interface that includes a menu view with a plurality of widgets, wherein each widget represents and allows for selection of a different flight crew decision aid application from a plurality of flight crew decision aid applications,
wherein responsive to selection of a widget representing an ATC clearance visualization app, displaying an ATC clearance display screen that provides a visualization of a current flight path, a plurality of selection buttons for displaying a plurality of simulated ATC clearance instructions, and a preview button selectable via a touch gesture for use in requesting that the ATC clearance visualization app display a preview of a selected ATC clearance instruction from the plurality of simulated ATC clearance instructions,
wherein responsive to selection of the preview button for a particular ATC clearance instruction, revising the active flight plan retrieved through data mining with flight path changes specified in the ATC clearance instruction without affecting the active flight plan of an onboard flight management system (FMS), generating a What-IF trajectory for the ATC clearance instruction and a graphical representation of the changes, and displaying the graphical representation of the changes as the preview of the selected ATC clearance instruction along with additional information related to the ATC clearance instruction.

13. The method of claim 12, wherein the additional information related to the ATC clearance instruction comprises an estimated time of arrival (ETA) and a projected fuel on board (FOB) if the clearance instruction is executed.

14. The method of claim 12, wherein the additional information related to the ATC clearance instruction comprises information regarding an impact with respect to fuel consumption, speed, and time.

15. The method of claim 12, wherein the additional information related to the ATC clearance instruction comprises a display of a potential alert associated with the clearance instruction.

16. The method of claim 12, wherein the additional information related to the ATC clearance instruction comprises a recommendation for flight plan changes regarding which the flight crew can negotiate with the ATC.

17. The method of claim 12, wherein generating a What-IF trajectory for the ATC clearance instruction comprises generating a What-IF trajectory for the ATC clearance instruction using one or more of real time atmospheric conditions, obstacles, and traffic data retrieved through a wireless interface and computing one or more theoretical trajectories using data from a Navigation Database (NDB) and aircraft specific databases such as an Aircraft Engine Database (AEDB) and a Performance Database (PDB).

18. The method of claim 12, further comprising submitting at least a portion of the flight path changes to an avionics system via the avionics interface.

19. The method of claim 12, further comprising mounting the TSC system in the aircraft cockpit, wherein the frame is mounted within an area previously occupied and vacated by a Multi-Function Control and Display Unit (MCDU) in the aircraft cockpit, wherein the TSC system has replaced the MCDU.

20. An avionics touchscreen system comprising a frame having a front face and a mechanical footprint that allows the TSC system to be mounted as a direct replacement for a Multi-Function Control and Display Unit (MCDU) in an area previously occupied and vacated by the MCDU in an aircraft cockpit, a touch screen user interface configured within the front face, an avionics interface comprising an MCDU interface for communicating with avionics systems on the aircraft, and one or more processors residing within the frame and configured by programming instructions encoded on non-transitory computer readable media to:
mine aircraft data from the avionics interface while the aircraft is executing a currently active flight plan while in flight during a mission, the mined aircraft data including active flight plan data from the currently active flight plan and aircraft state data;

provide a graphical user interface (GUI) display on the touch screen user interface that includes a menu view with a plurality of widgets, wherein each widget represents and allows for selection of a different flight crew decision aid application from a plurality of flight crew decision aid applications, receive, via a touch gesture associated with the GUI display, selection of a widget representing a flight crew decision aid application;

display a flight crew decision aid application display screen on the touch screen user interface for the selected flight crew decision aid application that provides a plurality of selection widgets for displaying a plurality of simulation instructions and a preview widget selectable via a touch gesture for use in requesting that the selected flight crew decision aid application display a preview of a selected simulation instructions from the plurality of simulation instruction;

receive, via the touch screen user interface, a selection of a selected simulation instruction and the preview widget;

compute a theoretical trajectory modification to the currently active flight plan corresponding to the selected simulation instruction using the mined aircraft data without affecting the active flight plan of an onboard flight management system (FMS);

generate a graphical representation of the theoretical trajectory modification; and cause the graphical representation of the theoretical trajectory modification to be displayed on the touch screen user interface as the preview of the selected simulation instruction along with additional information related to the simulation instruction.

\* \* \* \* \*